UNITED STATES PATENT OFFICE.

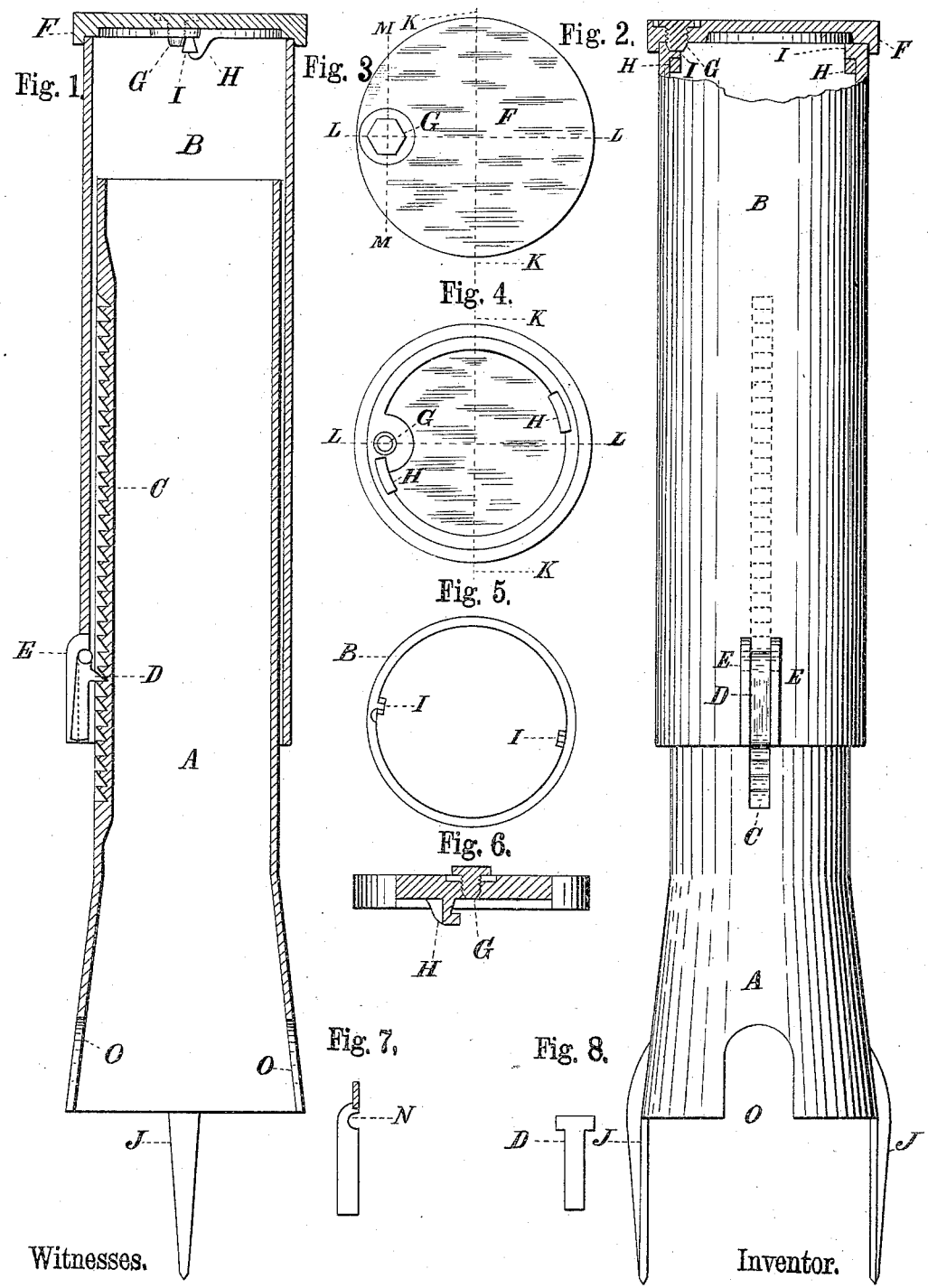

SETH A. BROWN, OF BUFFALO, NEW YORK.

EXTENSIBLE SERVICE-BOX FOR THE STOP-COCKS OF GAS, &c.

SPECIFICATION forming part of Letters Patent No. 317,920, dated May 12, 1885.

Application filed September 1, 1884. (No model.)

*To all whom it may concern:*

Be it known that I, SETH A. BROWN, a citizen of the United States, residing at Buffalo, in the county of Erie and State of New York, have invented an Improved Extensible Service-Pipe Box for the Stop-Cocks of Gas and Water Service Pipes, of which the following is a specification.

The objects of my improvements are, first, to provide a means of adjusting the box to the height required; second, a fastening for the cover or cap; third, a means of preventing the shifting of the box from its proper position; fourth, to allow the stop-cock to be more readily seen.

The box is formed of two tubes, one larger and sliding over the other. The outer tube has a cap or cover, and a pivoted and weighted pawl. The latter engages with a ratchet on the inner tube. The inner tube may have pickets at its lower end.

In the accompanying drawings, Figure 1 shows a vertical sectional view of the entire device, showing section of ratchet and section of cap, taken through the dotted line K K, Fig. 3. Fig. 2 is an exterior view showing front view of pawl and ratchet, and has the upper portion of outside tube broken away to show a sectional view of cap and tube, taken through the dotted line L L, Fig. 3. Fig. 3 is a top view of cap; Fig. 4, a bottom view of cap; Fig. 5, a top view of outer tube; Fig. 6, a sectional view of cap, taken through the dotted line M M, Fig. 3. Fig. 7 shows a side view of one of the bearings of pawl. Fig. 8 shows a front view of pawl D.

The tube A has formed thereon a ratchet or rows of teeth, C, which may extend entirely around the tube, or, as in the present instance, be sunk below the surface of the latter, (which is made thicker at this part,) thereby forming a channel or guide to keep the pawl in its proper place.

J represents the spikes or pickets, which prevent the tube A from shifting while the earth is being tamped around it, and holds it in place over the stop-cock.

O O represent openings in the bottom of the tube A, to admit the gas or water pipes.

The tube B has two ribs, E E, at its lower end, each having inwardly-opening bearings N, Fig. 7, for the journals of the pawl D.

The bearings N N are preferably cast open to facilitate construction. The weight of the pawl D keeps it bearing against the ratchet C, thus forming an automatic lock or fastening.

The cap F has two or more projections, H H, the notches of which engage with lugs I I on the interior of the tube B when the cap is turned. The latter is provided with a threaded hole to receive a screw.

A screw, G, (which may have a conical end,) in the cap F, is turned down against one of the lugs I, thus holding the cap from turning and forming a secure fastening. There is a recess in the tube B, close to one of the lugs, to admit the screw end, or the lug may be made wider to form a bearing for the screw end.

The interior of both tubes may be painted white, thus illuminating by reflected light. This facilitates placing the wrench, and enables the operator to see whether the stop-cock is open or closed or whether the tube is in proper position.

The tube A can be constructed with or without the pickets J J, and any suitable form of cap and fastening may be used to cover the tube B.

The above method of construction forms a very efficient, durable, easily constructed and operated service-pipe box containing entirely new and valuable features.

Service-boxes formed of sliding tubes are not new, and I do not claim such.

I do not broadly claim the use of the pawl-and-ratchet movement in connection with sliding tubes, nor the use of a cap for service-pipe boxes, having a counter-sunk recess in its top in connection with a fastening-screw; but What I do claim as new, and desire to secure by Letters Patent, is—

A service-pipe box formed of the tube A, provided with openings O O, and a longitudinal ratchet, C, formed in its periphery and sunk below or even with the adjacent surface of said tube, and the tube B, sliding over the tube A, provided with a suitable cap, and a pawl, D, which engages with the ratchet on tube A.

SETH A. BROWN.

Witnesses:
 WM. F. YOUNG,
 ALB. SCHETTER.